(12) United States Patent
Danzig et al.

(10) Patent No.: US 9,049,399 B2
(45) Date of Patent: *Jun. 2, 2015

(54) DIGITAL UP-CONVERTER AND N-CHANNEL MODULATOR WITH FLEXIBLE ASSOCIATION OF QAM GENERATION RESOURCES TO NARROWCAST AND BROADCAST FREQUENCIES

(71) Applicant: Broadcom Corporation, Irvine, CA (US)

(72) Inventors: Joel I. Danzig, Alpharetta, GA (US);
Richard S. Prodan, Niwot, CO (US);
Niki Pantelias, Duluth, GA (US);
Thomas Kolze, Phoenix, AZ (US);
Victor T. Hou, La Jolla, CA (US);
Taruna Tjahjadi, Snellville, GA (US)

(73) Assignee: Broadcom Corporation, Irvine, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/739,688

(22) Filed: Jan. 11, 2013

(65) Prior Publication Data

US 2013/0128125 A1    May 23, 2013

Related U.S. Application Data

(63) Continuation of application No. 12/986,772, filed on Jan. 7, 2011, now Pat. No. 8,369,433.

(60) Provisional application No. 61/293,489, filed on Jan. 8, 2010.

(51) Int. Cl.
*H04K 1/10*  (2006.01)
*H04L 27/28*  (2006.01)
*H04N 5/40*  (2006.01)
*H04L 5/06*  (2006.01)
*H04L 27/36*  (2006.01)
*H04L 25/03*  (2006.01)

(52) U.S. Cl.
CPC .. *H04N 5/40* (2013.01); *H04L 5/06* (2013.01);
*H04L 25/03006* (2013.01); *H04L 27/36* (2013.01)

(58) Field of Classification Search
CPC ...... H04N 5/40; H04L 5/06; H04L 25/03006; H04L 27/36
USPC ........... 375/260, 298, 295; 455/102, 103, 118
See application file for complete search history.

(56) References Cited

U.S. PATENT DOCUMENTS 6,011,785 A * 1/2000 Carney et al. .................. 370/330
6,144,648 A 11/2000 Kurokami
6,856,590 B2 2/2005 Okada et al.

(Continued)

*Primary Examiner* — Phuong Phu
(74) *Attorney, Agent, or Firm* — Sterne, Kessler, Goldstein & Fox P.L.L.C.

(57) ABSTRACT

Embodiments of a digital up-converter and an N-channel modulator are provided herein. The embodiments of the digital up-converter, in combination with the N-channel modulator, are capable of efficiently filling the spectrum of one or more RF signals with one or more types of information signals. For example, the digital up-converter can fill the spectrum of one or more RF signals with both broadcast and narrowcast video and data signals. In addition, the digital up-converter is capable of flexibly mapping the information signals to one or more channels of the one or more RF signals using a novel, three-level switching architecture.

20 Claims, 4 Drawing Sheets

(56) References Cited

U.S. PATENT DOCUMENTS

| | | |
|---|---|---|
| 6,859,502 B1 | 2/2005 | Tatsuta et al. |
| 6,980,509 B1 | 12/2005 | Okada et al. |
| 8,369,433 B2 * | 2/2013 | Danzig et al. ............ 375/260 |
| 2003/0228845 A1 * | 12/2003 | Peng et al. ............ 455/67.11 |
| 2005/0152462 A1 | 7/2005 | Tatsuta et al. |
| 2009/0202019 A1 | 8/2009 | Rofougaran |
| 2010/0054357 A1 | 3/2010 | Fujimura et al. |
| 2010/0158086 A1 | 6/2010 | Kim et al. |

* cited by examiner

DIGITAL UP-CONVERTER AND N-CHANNEL MODULATOR WITH FLEXIBLE ASSOCIATION OF QAM GENERATION RESOURCES TO NARROWCAST AND BROADCAST FREQUENCIES

CROSS REFERENCE TO RELATED APPLICATIONS

This application is a continuation of U.S. patent application Ser. No. 12/986,772, filed Jan. 7, 2011, which claims the benefit of U.S. Provisional Application No. 61/293,489, filed Jan. 8, 2010, all of which are incorporated herein by reference.

FIELD OF THE INVENTION

This application relates generally to up-converters and more particularly to a digital up-converter for flexibly mapping data streams to one or more output channels of one or more radio-frequency (RF) signals.

BACKGROUND

Today's distribution networks, such as cable distribution networks, can deliver a mix of video and data signals downstream to subscribers over a single RF output port. The video signals delivered may include both broadcast video signals and narrowcast video signals (e.g., video-on-demand signals). Although operators of distribution networks are now capable of sending these diverse types of signals (i.e., video and data) simultaneously over a single RF output port downstream to subscribers, the cost of such diverse data distribution remains relatively high.

For example, cable distribution networks generally employ two types of distinct devices for generating video and data signals; in particular, a cable modem termination system (CMTS) is generally used to generate and distribute data signals based on the DOCSIS standard and an edgeQAM (EQAM) is used to generate and distribute video signals. The signals from these two devices are combined and then transmitted downstream to subscribers. The need for two distinct devices to generate each type of signal is not cost effective in terms of the amount of equipment, power, and space needed. Moreover, these devices are typically limited in the number of channels they can produce and the ability to flexibly position each channel within a downstream RF signal spectrum.

Therefore, what is needed is a system for flexibly mapping input video and data streams to one or more output channels of a downstream RF signal, while reducing power, size, and cost requirements associated with prior implementations found in distribution networks.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The description below describes a digital up-converter and an N-channel modulator that are capable of efficiently filling the spectrum of one or more downstream RF signals with one or more types of information signals. For example, the digital up-converter, in combination with the N-channel modulator, can fill the spectrum of one or more downstream RF signals with both broadcast and narrowcast video signals and data signals. In addition, the digital up-converter is capable of flexibly mapping these information signals to one or more channels of the one or more RF signals using a novel, three-level switching architecture that can be scaled to accommodate a large number of information signals. These and other features of the digital up-converter and N-channel modulator are explained further below with reference to FIGS. 1-4.

Figure 1:
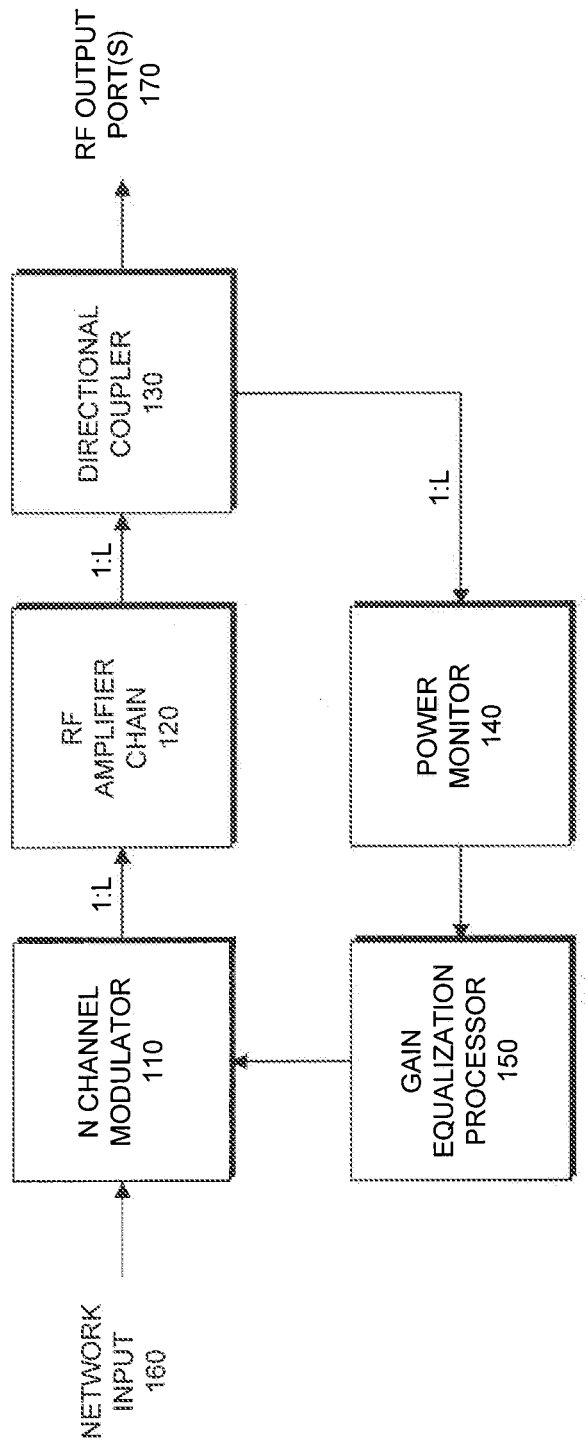
FIG. 1 illustrates a block diagram of a system for flexibly mapping input video and data streams to one or more output channels of a downstream RF signal, according to embodiments of the present invention.

Referring now to FIG. 1, an exemplary block diagram of the digital up-converter 100 is illustrated, according to embodiments of the present invention. Digital up-converter 100 is configured to flexibly map information signals to one or more channels of one or more downstream RF signals. In one embodiment, digital up-converter 100 is implemented as a system on a chip (SOC) and is configured to be used in a distribution network, such as a cable distribution network, for distributing video and DOCSIS data signals downstream to individual and multiple subscribers. In general, when an information signal is distributed downstream over a single RF channel on an RF port, the transmission is referred to as a narrowcast transmission, and when an information signal is distributed downstream over an RF channel on multiple RF ports, the transmission is referred to as a broadcast transmission.

As illustrated in FIG. 1, digital up-converter 100 includes an N-channel modulator 110, an RF amplifier chain 120, a directional coupler 130, a power monitor 140, and a gain equalization processor 150. In operation, N-channel modulator 110 receives via network input 160 the information signals to be sent downstream to the subscribers via one or more RF output ports 170. The information signals may include both video and data, such as data formatted in accordance with the DOCSIS specification. In an embodiment, the information signals are received via network input 160 from one or more Ethernet links, such as 10G Ethernet links, and each of the one or more RF output ports 170 is an F connector.

Upon receiving the information signals via network input 160, N-channel modulator 110 is configured to packetize each information signal into a respective data stream. After packetization, N-channel modulator 110 subsequently modulates the data streams using one or more modulation schemes and orders (e.g., 64-QAM and 256-QAM) and maps each of the modulated data streams to one or more channels of one or more RF signals. For example, and as illustrated in FIG. 1, there can be a total of L RF signals (provided as outputs by N-channel modulator 110) to which the modulated data streams are mapped. In one embodiment, each information signal to be sent downstream is packetized into an MPEG-transport stream and is modulated in accordance with the ITU-T J.83 Annex A, B, or C recommendation.

RF amplifier chain 120 receives the L RF signals from N-channel modulator 110 and conditions the L RF signals prior to transmitting them downstream to the subscribers. For example, RF amplifier chain 120 may individually, or as a group, provide gain and filtering to the L RF signals.

After having been conditioned, directional coupler 130 receives the L RF signals from RF amplifier chain 120. Directional coupler 130 is configured to send most of the signal power from each of the L RF signals downstream over an associated one of the RF output ports 170. In addition, directional coupler 130 is further configured to feedback a small portion of the signal power from one or more of the L RF signals to power monitor 140.

Power monitor 140 is configured to process the signal power from the one or more of the L RF signals to estimate the power and/or linear distortion associated with these signals. This estimated information is then provided to gain equalization processor 150 which uses the estimated information to adjust the gain and/or filter characteristics of one or more of the N-modulators in N-channel modulator 110 that are associated with the one or more of the L RF signals for which the power and/or linear distortion was estimated. The gain and filter characteristics of the one or more N-modulators are adjusted to level their associated channel powers and/or correct, for example, any linear distortion caused by the processing blocks of up-converter 100 and/or the connector and mediums coupled to each of the RF output ports 170.

Figure 2:
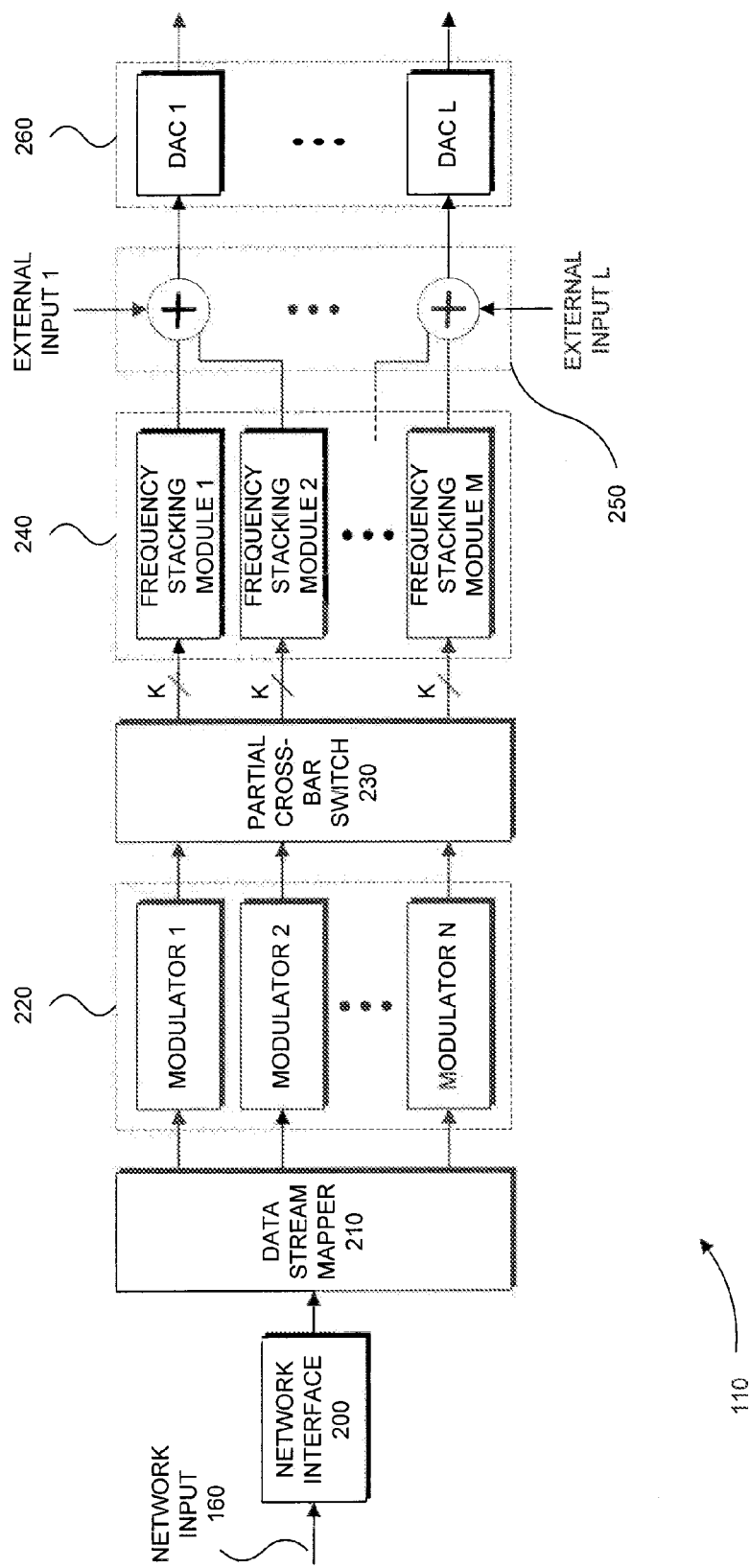
FIG. 2 illustrates an exemplary N-channel modulator, according to embodiments of the present invention.

Turning now to FIG. 2, an exemplary embodiment of an N-channel modulator 110 is illustrated. N-channel modulator 110 includes a network interface 200, a data stream mapper 210, N modulators 220, a partial crossbar switch 230, M frequency stacking modules 240, L adders 250, and L digital-to-analog converters (DACs) 260.

As discussed above, in regard to FIG. 1, N-channel modulator 110 is configured to receive via network input 160 the information signals to be sent downstream to the subscribers. In the embodiment of FIG. 2, the architecture of N-channel modulator 110 includes three-levels of switching that are configured to flexibly map the information signals to one or more channels of one or more RF signals provided at the outputs of the L DACs 260. The information signals received via network input 160 can include both broadcast and narrowcast video signals and data signals, such as data signals formatted in accordance with the DOCSIS standard. In one embodiment, the information signals are encapsulated in Ethernet frames and are delivered by one or more Ethernet links coupled to network input 160.

In operation, network interface 200 is configured to packetize the information signals into respective data streams and provide the data streams to mapper 210. Mapper 210 is subsequently configured to classify and route each data stream to one or more of the N modulators 220. For example, for a broadcast video stream, Mapper 210 can route the stream to multiple ones of the N modulators 220. This routing performed by data stream mapper 210 provides for the first level of the three levels of switching implemented by N-channel modulator 110. Each of the N modulators is configured to modulate the data streams using a particular modulation scheme and order (e.g., 64-QAM, 256-QAM, etc.).

Figure 3:
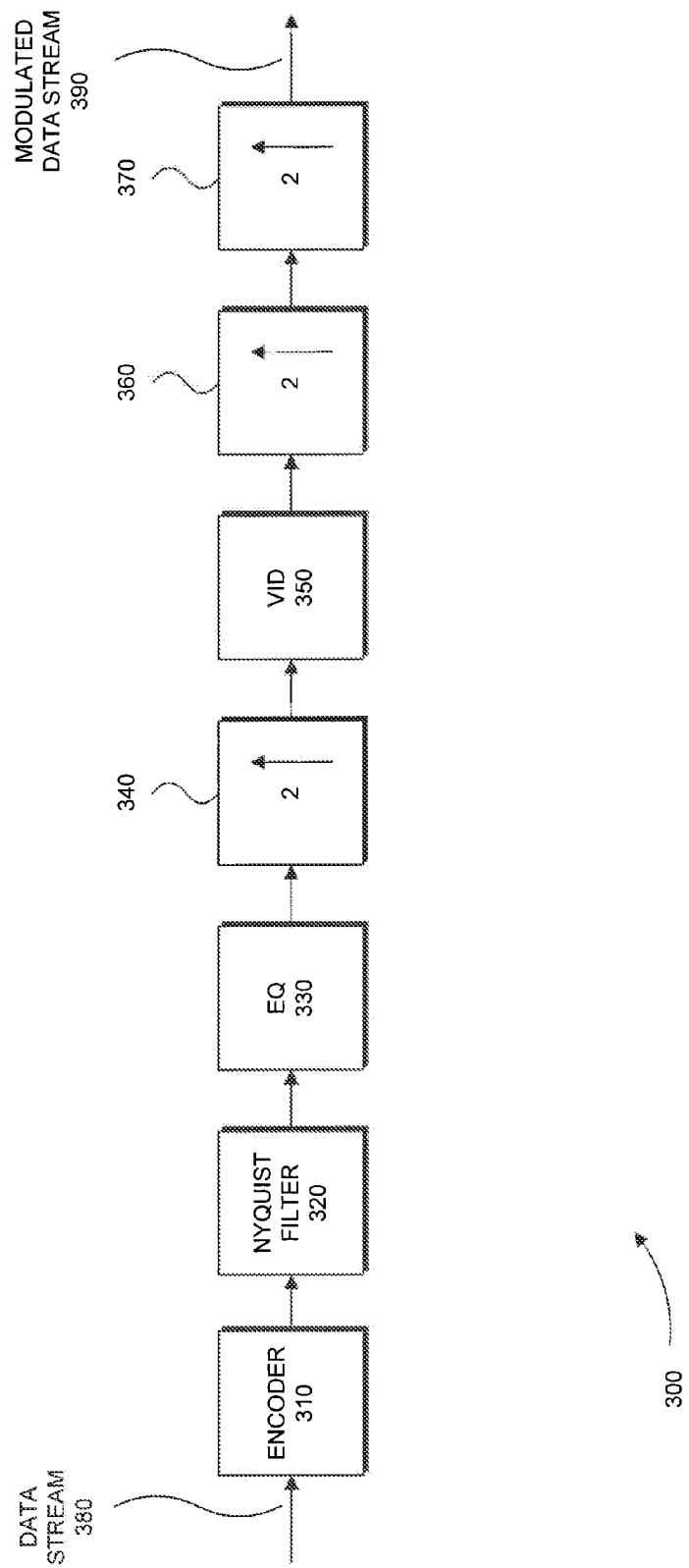
FIG. 3 illustrates an exemplary quadrature amplitude modulation (QAM) modulator, according to embodiments of the present invention.

In one embodiment, each information signal is integrated into an MPEG-transport stream by network interface 200 and is modulated in accordance with the ITU-T J.83 Annex A, B, or C recommendation by the N modulators 220 to produce N modulated data streams. Additional details of the N modulators 220 will be described now in regard to. FIG. 3.

FIG. 3 illustrates an exemplary implementation of a modulator 300. In an embodiment, one or more of the N modulators 220 can be implemented in the same manner and configuration as modulator 300. As illustrated in FIG. 3, modulator 300 includes an encoder 310, a Nyquist filter 320, an equalizer 330, a first optional interpolator 340, a variable interpolator and decimator (VID) 350, and second and third optional interpolators 360 and 370.

In an embodiment, encoder 310 is configured to modulate the received data stream 380 using a particular modulation scheme and order (e.g., 64 QAM and 256-QAM). In another embodiment, encoder 310 is configured to modulate and encode the received data stream 380 in accordance with the ITU-T J.83 Annex A, B, or C recommendation and may include, among other features, an ITU-T J.83 Annex A, B, or C FEC encoder, an interleaver, and a block for performing trellis coded modulation. The modulated output of the encoder 310 is subsequently filtered by Nyquist filter 320 (e.g., a raised cosine filter) that is configured to shape the digital pulses to reduce or eliminate inter-symbol interference (ISI). The filtered output of Nyquist filter 320 is subsequently processed by equalizer 330 that is configured to perform channel equalization and correct for linear distortions. The coefficients of equalizer 330 can be programmed by a gain equalization processor, such as gain equalization processor 150 illustrated in FIG. 1.

Finally, the output of equalizer 330 is interpolated by a series of optional interpolators 340, 360, 370, and VID 350, which can perform a variable amount of interpolation and decimation on the modulated data stream. In one embodiment, interpolation is performed by these blocks such that the modulated data stream 390 is provided at a fixed, predetermined sample rate. This interpolation scheme can be used by each of the N modulators 220 illustrated in FIG. 2 to provide modulated data streams that each have the same sample rate. By providing each modulated data stream with equal sample rates, the combining, switching, and up-converting performed on each of these modulated data streams by later modules in N-channel modulator 110 is simplified.

Referring back to FIG. 2, after being generated by the N modulators 200, the N modulated data streams are received by partial crossbar switch 230. Partial crossbar switch 230 provides for the second level of the three levels of switching implemented by N-channel modulator 110. In general, a crossbar switch is used to distribute the data received at each of its input ports to one or more of its output ports.

A fully implemented crossbar switch is capable of connecting each of its input ports to any number and any specific ones of its output ports. Within N-channel modulator 110, a fully implemented crossbar switch could be used to provide complete distribution flexibility for each of the N modulated data streams; in other words, a fully implemented crossbar switch can be used to allow each of the N modulated data streams, coupled to respective inputs of the fully implemented crossbar switch, to be distributed to any number and any specific ones of its output ports. In this way, the frequency position of each modulated data stream within one or more of the RF signals to be sent downstream to the subscribers can be fully controlled. However, the complexity associated with a fully implemented crossbar switch becomes prohibitively expensive as the number of inputs and outputs of the crossbar switch increases.

Therefore, to maintain adequate scalability, N-channel modulator 110 implements a partial crossbar switch 230, rather than a fully implemented crossbar switch. Partial crossbar switch 230 is capable of distributing each of the N modulated data streams to one or more of M sets of K output ports. More specifically, and as illustrated in FIG. 2, partial crossbar switch 230 has M sets of K outputs, where each set of K outputs is coupled to a different one of the M frequency stacking modules 240. Partial crossbar switch 230 is configured to distribute each of the N modulated data streams to one or more of the M frequency stacking modules 240. However, because partial crossbar switch 230 is not a fully implemented crossbar switch, it cannot control the exact output port by which a particular modulated data stream is delivered to one of the M frequency stacking modules 240.

Thus, a third and final level of switching is provided by the M frequency stacking modules 240. This third level of switching maintains full flexibility of N channel modulator 110 in terms of the ultimate frequency position of each of the N modulated data streams within one or more of the RF signals to be sent downstream to the subscribers.

It should be noted that partial crossbar switch 230 can have more than K output ports for each of the M sets illustrated in FIG. 2. In other words, the integer value K represents a minimum number of output ports for each of the M sets of output ports. For example if K is two, each of the M sets of output ports includes two or more output ports.

Figure 4:
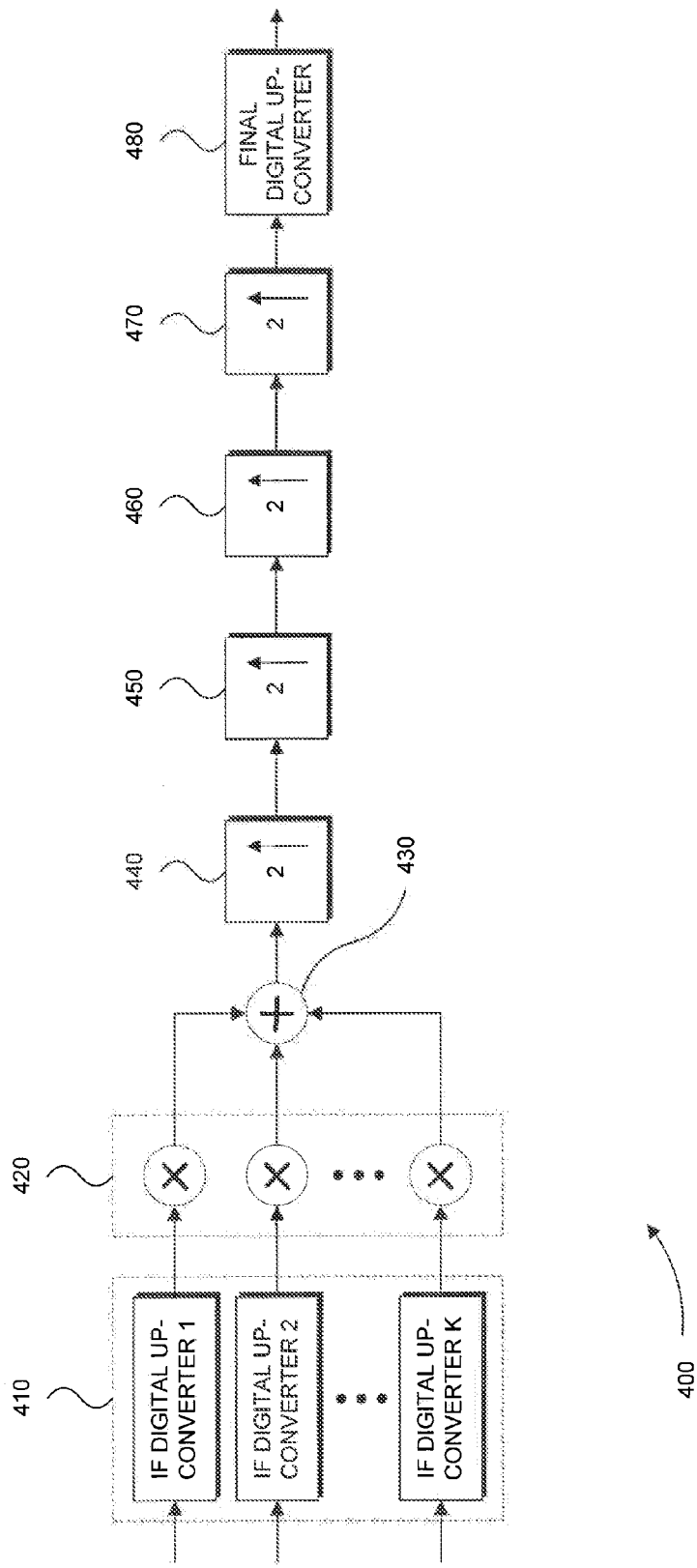
FIG. 4 illustrates an exemplary frequency stacking module, according to embodiments of the present invention.

Turning now to the M frequency stacking modules 240, an exemplary implementation of a frequency stacking module 400 is illustrated in FIG. 4. As illustrated in FIG. 4, frequency stacking module 400 includes K intermediate frequency (IF) digital up-converters 410, K optional gain modules 420, a K-input adder 430, one or more optional interpolators 440-470, and a final digital up-converter 480.

In operation, the K IF digital up-converters 410 receive a respective one of K modulated data streams from partial crossbar 230 illustrated in FIG. 2. Each of the K IF digital up-converters 410 is configured to up-convert its respective modulated data stream to any one of a plurality of different frequency positions.

In one embodiment, each of the K IF digital up-converters 410 includes a direct digital synthesizer (DDS) that is configured to generate a sine wave having any one of a plurality of frequencies. The DDS includes a reference clock signal, a numerically controlled oscillator (NCO), a sine look-up table, and a phase accumulator. Once generated, the sine wave and the modulated data stream can be multiplied to up-convert the modulated data stream to the frequency of the sine wave.

The frequency of the sine wave generated by the DDS essentially depends on two variables: the frequency of the reference clock signal and a number, often referred to as a "tuning word," programmed into a control register. The number programmed into the control register provides the main input into the phase accumulator. The phase accumulator computes a phase angle or address for the sine look-up table, which outputs the digital amplitude corresponding to the sine of the phase angle. The value of the accumulator is incremented by the number stored in the control register with each cycle of the reference clock signal. If the number stored in the control register is large, the phase accumulator will step quickly though the sine look-up table and thus generate a high frequency sine wave. On the other hand, if the number stored in the control register is small, the phase accumulator will take many more steps to step through the sine look-up table and therefore generate a comparatively lower frequency sine wave. Because the number stored in the control register can be programmed, the frequency of the sine wave generated by the DDS can be controlled. Thus, the frequency position of the modulated data stream can be placed at any one of a plurality of different frequencies simply be reprogramming the control register.

This flexibility constitutes a portion of the third and final level of switching provided by N-channel modulator 110 illustrated in FIG. 2. It allows the K IF digital up-converters 410 to stack the data stream in any one of a plurality of different orders in frequency. Each of the K IF digital up-converters 410 is programmed (via its respective control register) to up-convert its respectively received modulated data stream to a different frequency position. It should be noted that other implementations of the DDS are possible without departing from the scope and spirit of the present invention, as would be apparent to a person of ordinary skill in the art. For example, as opposed to using a straight sine look-up table, the Coordinate Rotation Digital Computer (CORDIC) algorithm can be used in the implementation of the DDS.

Once all of the modulated data streams are up-converted, they are added together via K-input adder 430 to produce a frequency stack of K output channels. It should be further noted that, prior to being added together via K-input adder 430, the K optional gain modules 420 can be used to provide a particular gain to one or more of the up-converted modulated data streams produced by the K IF digital up-converters 410.

The frequency stack of K output channels is optionally interpolated by the one or more interpolators 440-470. Although four, 2× interpolators are illustrated in FIG. 4, any reasonable number of interpolators can be used and each interpolator can have any interpolation factor (i.e., they are not limited to a 2× interpolation factor as shown). Interpolators 440-470 are configured to increase the sample rate of the frequency stack of K output channels received from K-input adder 430. In one embodiment, the sample rate is increased to allow further up-conversion of the frequency stack of K output channels by the final digital up-converter 480 and/or eventual conversion of the frequency stack of K output channels by a DAC (not shown).

After undergoing the optional interpolation, the frequency stack of K output channels is received by final digital up-converter 480. In operation, final digital up-converter 480 is configured to up-convert the frequency stack of K output channels to any one of a plurality of different frequency positions. In one embodiment, final digital up-converter 480 accomplishes this using a DDS in the same manner as the K IF digital up-converters 410. A control register, associated with the DDS within the final digital up-converter 480, can be programmed to generate a sine wave having a particular frequency. The sine wave and the frequency stack of K output channels are then multiplied to up-convert the frequency stack of K output channels to the frequency of the sine wave. Thus, the position of the frequency stack of K output channels can be placed at any one of a plurality of different frequencies simply by reprogramming the control register of its DDS.

This flexibility constitutes the remaining portion of the third and final level of switching provided by N-channel modulator 110 illustrated in FIG. 2. It allows final digital up-converter 480 to position the frequency stack of K output channels at any one of a plurality of different frequencies. For example, the frequency stack of K output channels can be positioned at a frequency of 650 MHz or 875 MHz.

Referring back to FIG. 2, each of the L adders 250 sums a different group of up-converted frequency stacks of K output channels produced by the M frequency stacking modules 240. In one embodiment, an additional up-converted frequency stack of output channels is received by one or more of the L adders 250 from an external source. For example, the external source may be a separate chip.

After being added, the combined frequency stacks of channels form the spectrum of one RF signal to be transmitted downstream to the subscribers. Each of the combined frequency stacks are converted from a digital signal to an analog signal by one of the L DACs 260 prior to transmission.

In one embodiment of N-channel modulator 110, N=352, M=20, K=32, and L=4. In this embodiment, 352 separate modulators are included in N modulator 220 to generate 352 separate modulated data streams. These 352 modulated data streams may include, for example, 96 broadcast channels and a combination of 256 narrowcast and DOCSIS data channels. Partial crossbar switch 320 is configured to receive these 352 modulated data streams and couple each to one or more of its 20 sets of 32 outputs. In one embodiment, one or more of the 96 broadcast channels are distributed, by partial crossbar switch 320, to at least 2 of its 20 sets of 32 outputs. The remaining narrowcast and DOCSIS data channels are each distributed, by partial crossbar switch 320, to a single one of its 20 sets of 32 outputs.

After the modulated data streams are distributed, they are frequency stacked by the 20 frequency stacking modules by M frequency stacking modules 240. In particular, each of the 20 frequency stacking modules is configured to stack the modulated data streams in any order. In one embodiment, the modulated data streams have a bandwidth of 6 MHz (modulated in accordance with ITU-T J.83 Annex B recommendation) and are stacked within a bandwidth of approximately 120 MHz (not accounting for any necessary channel spacing). In another embodiment, the modulated data streams have a bandwidth of 8 MHz (modulated in accordance with ITU-T J.83 Annex A recommendation) and are stacked within a bandwidth of approximately 160 MHz (not accounting for any necessary channel spacing). In yet another embodiment, the modulated data streams have a bandwidth of 6 or 8 MHz (modulated in accordance with either ITU-T J.83 Annex A or B recommendation) and are stacked within a bandwidth of approximately 120-160 MHz (not accounting for any necessary channel spacing).

After being stacked in frequency, the stack of modulated data streams are further up-converted by the 20 frequency stacking modules. After this final up-conversion five sets of the up-converted stacks of modulated data streams are combined by each of the four adders in L adders 250. These combined frequency stacks of modulated data streams form the spectrum of one of the four RF signals to be transmitted downstream to the subscribers. Each of the combined frequency stacks are converted from a digital signal to an analog signal by one of the four DACs in L DACs 260 prior to transmission.

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A multi-channel modulator configured to flexibly map input data streams to output channels, the modulator comprising:
    modulators configured to modulate the input data streams and provide as output modulated data streams;
    a partial crossbar switch configured to distribute each of the modulated data streams to one or more sets of modulated crossbar streams; and
    frequency stacking modules each configured to stack, in frequency and in any one of a plurality of different orders, the modulated crossbar streams for a different one of the sets of modulated crossbar streams to produce a frequency stack of output channels.

2. The multi-channel modulator of claim 1, further comprising final digital up-converters each configured to up-convert a different one of the frequency stacks of output channels to any one of a plurality of different frequency positions.

3. The multi-channel modulator of claim 2, further comprising an adder configured to sum a plurality of the up-converted frequency stacks of output channels to produce a summed signal.

4. The multi-channel modulator of claim 3, further comprising a digital-to-analog converter configured to convert the summed signal to an RF signal.

5. The multi-channel modulator of claim 1, wherein the modulators are configured to modulate the input data streams using quadrature amplitude modulation.

6. The multi-channel modulator of claim 1, wherein the modulators comprise filters configured to shape the modulated data streams to reduce nter-symbol interference.

7. The multi-channel modulator of claim 1, wherein the modulators comprise equalizers configured to implement channel equalization.

8. The multi-channel modulator of claim 1, wherein the modulators comprise variable interpolators and decimators configured to convert respective symbol rates of the modulated data streams to a fixed rate sample domain.

9. The multi-channel modulator of claim 1, wherein at least one of the frequency stacking modules comprises a gain control module configured to independently adjust a gain of one or more intermediate frequency (IF) digital up-converters.

10. A digital up-converter, comprising:
- a partial crossbar switch configured to receive modulated data streams and distribute each of the modulated data streams to one or more sets of modulated crossbar streams; and
- frequency stacking modules each configured to stack, in frequency and in any one of a plurality of different orders, the modulated cross bar streams for a different one of the sets of modulated crossbar streams to produce a frequency stack of output channels: and
- final digital up-converters each configured to up-convert a different one of the frequency stacks of output channels to any one of a plurality of different frequency positions.

11. The digital up-converter of claim 10, further comprising an adder configured to sum a plurality of the up-converted frequency stacks of output channels to produce a summed signal.

12. The digital up-converter of claim 11, further comprising a digital-to-analog converter configured to convert the summed signal to an RF signal.

13. The digital up-converter of claim 10, wherein the modulated data streams are quadrature amplitude modulated data streams.

14. The digital up-converter of claim 10, further comprising a filter configured to shape one of the modulated data streams to reduce inter-symbol interference.

15. The digital up-converter of claim 10, further comprising an equalizer configured to implement channel equalization.

16. The digital up-converter of claim 10, further comprising variable interpolators and decimators configured to convert respective symbol rates of the modulated data streams to a fixed rate sample domain.

17. The digital up-converter of claim 10, wherein at least one of the frequency stacking modules comprises a gain control module configured to independently adjust a gain of one or more intermediate frequency (IF) digital up-converters.

18. A method for flexibly mapping modulated data streams to output channels, the method comprising:
- distributing each of the modulated data streams to one or more sets of modulated crossbar streams using a partial cross-bar switch;
- stacking the modulated cross bar streams in one of the plurality of sets of modulated crossbar streams in frequency to produce a frequency stack of output channels; and
- up-converting the frequency stack of output channels to any one of a plurality of different frequency positions.

19. The method of claim 18, further comprising summing the up-converted frequency stack of output channels with a plurality of other up-converted frequency stacks of output channels.

20. The method of claim 18 further comprising converting respective symbol rates of the modulated data streams to a fixed rate sample domain.

* * * * *

UNITED STATES PATENT AND TRADEMARK OFFICE
CERTIFICATE OF CORRECTION

PATENT NO. : 9,049,399 B2
APPLICATION NO. : 13/739688
DATED : June 2, 2015
INVENTOR(S) : Danzig et al.

Page 1 of 1

It is certified that error appears in the above-identified patent and that said Letters Patent is hereby corrected as shown below:

In the Claims:

Column 8, line 67, please replace "reduce nter-symbol interference" with --reduce inter-symbol interference--.

Signed and Sealed this
Twenty-sixth Day of July, 2016

Michelle K. Lee
*Director of the United States Patent and Trademark Office*